United States Patent [19]

Kim

[11] Patent Number: 5,626,374

[45] Date of Patent: May 6, 1997

[54] VIDEO CASSETTE RECORDER INCORPORATING THEREIN A DOOR OPENING DEVICE FOR SELECTIVELY EXPOSING/CONCEALING OPERATING BUTTONS ON A FRONT PANEL THEREOF

[75] Inventor: Heong-III Kim, Seoul, Rep. of Korea

[73] Assignee: Daewoo Electronics Co., Ltd., Seoul, Rep. of Korea

[21] Appl. No.: 622,224

[22] Filed: Mar. 27, 1996

[30] Foreign Application Priority Data

Mar. 31, 1995 [KR] Rep. of Korea ................ 95-6237

[51] Int. Cl.⁶ .................................................. E05C 1/12
[52] U.S. Cl. .......................... 292/170; 292/DIG. 37; 292/163; 292/137
[58] Field of Search .......................... 292/165, 169, 292/170, 37; 200/50.02, 50.12, 50.14, 50.18; 220/341, 345

[56] References Cited

U.S. PATENT DOCUMENTS

| | | | |
|---|---|---|---|
| 1,257,998 | 3/1918 | Gruber | 292/170 |
| 1,287,973 | 12/1918 | Gruber | 292/37 |
| 1,965,939 | 7/1934 | Jacobi | 292/170 |
| 2,036,154 | 3/1936 | Littledale | 292/37 |
| 2,186,666 | 1/1940 | Cereda | 292/37 |
| 2,247,937 | 7/1941 | Bittorf et al. | 292/37 |
| 2,411,098 | 11/1946 | Leiss | 292/170 |
| 3,090,643 | 5/1963 | Barnes, Sr. | 292/37 |
| 3,919,866 | 11/1975 | Lipshutz | 292/170 |
| 4,109,950 | 8/1978 | Amdal | 292/37 |
| 4,664,440 | 5/1987 | Kano et al. | 292/170 |
| 4,809,867 | 3/1989 | Choi | 220/211 |
| 5,193,667 | 3/1993 | Choi | 200/331 |

*Primary Examiner*—Steven N. Meyers
*Assistant Examiner*—Stephen J. Pentlicki
*Attorney, Agent, or Firm*—Anderson Kill & Olick P.C.

[57] ABSTRACT

A video cassette recorder is provided with a door opening device for selectively exposing or concealing operating buttons for inputting recording reservation data mounted on a front panel thereof. The device comprises a preprogramming start button slidable from a first position, the first position being located farthest away from the front panel to a second position, the second position being located closest to the front panel, and including a button body, a depressing bar extending from the button body, and an urging member having an end slant surface and extending from the button body to pass through the front panel, a door member pivotably attached to a lower portion of the front panel from a position when the door member is completely closed, to a position when the door is completely opened and including a folded extension having a pin receiver and a slant surface at its free end, and a locking pin slidable from a position when the locking pin is retained through the pin receiver, to a position when the locking pin is released from the pin receiver.

3 Claims, 3 Drawing Sheets

VIDEO CASSETTE RECORDER INCORPORATING THEREIN A DOOR OPENING DEVICE FOR SELECTIVELY EXPOSING/CONCEALING OPERATING BUTTONS ON A FRONT PANEL THEREOF

FIELD OF THE INVENTION

The present invention relates to a video cassette recorder (VCR); and, more particularly, to a VCR incorporating therein a door opening device for selectively exposing/ concealing operating keys or buttons on a front panel of the VCR.

DESCRIPTION OF THE PRIOR ART

Most VCRs of today are programmable to record desired TV programs at a later reserved time. For such a programming operation, the VCR is provided with a group of buttons or keys on a front panel thereof or on a remote control for inputting the user's instructions to, for example, a system controller. In addition to such preprogram recording buttons, the VCR is also provided with buttons for other functions, e.g., reproduce, rewind, fast-forward, etc., arranged on the front panel or the remote control in, e.g., the vicinity of the preprogram recording buttons.

However, given such a plurality of operating buttons arrayed in close proximity to each other, it is difficult for a user to properly manipulate the buttons to input his programming instructions. More specifically, at a given instant, the user may experience sudden difficulty to determine which button has to be pushed next in a programming instruction inputting sequence. Furthermore, the user may input an errneous instruction by mistakenly manipulating the buttons provided on the front panel or the remote control, thereby starting an unintended operation.

SUMMARY OF THE INVENTION

It is, therefore, a primary object of the invention to provide a VCR incorporating therein a door opening device for selectively exposing/concealing operating keys.

In accordance with the present invention, there is provided a video cassette recorder provided with a door opening device for selectively exposing or concealing operating buttons used to input recording reservation data and mounted on a front panel thereof, wherein the door opening device comprises: a preprogramming start button slidably mounted to the front panel from a first position, wherein the preprogramming start button is located farthest away from the front panel, to a second position, wherein the preprogramming start button is located closest to the front panel, and including a button body positioned outside of the front panel, a depressing bar extending from the button body to pass through the front panel, and an urging member having an end-slanted surface and extending from the button body to pass through the front panel; a door member pivotably attached to a lower portion of the front panel from a position wherein, when the preprogramming start button is in the first position, the door member is completely closed, to a position wherein, when the preprogramming start button is in the second position, the door is completely opened, and including a folded extension having a pin receiver and a slanted surface at its free end; and an interlocking means slidably movable from a position wherein, when the preprogramming start button is in the first position, the interlocking means is retained through the pin receiver, to a position wherein, when the preprogramming start button is in the second position, the interlocking means is released from the pin receiver.

BRIEF DESCRIPTION OF THE DRAWINGS

The above and other objects and features of the present invention will become apparent from the following description of preferred embodiments, when given in conjunction with the accompanying drawings, in which.

DETAILED DESCRIPTION OF THE PREFERRED EMBODIMENTS

Figure 1:
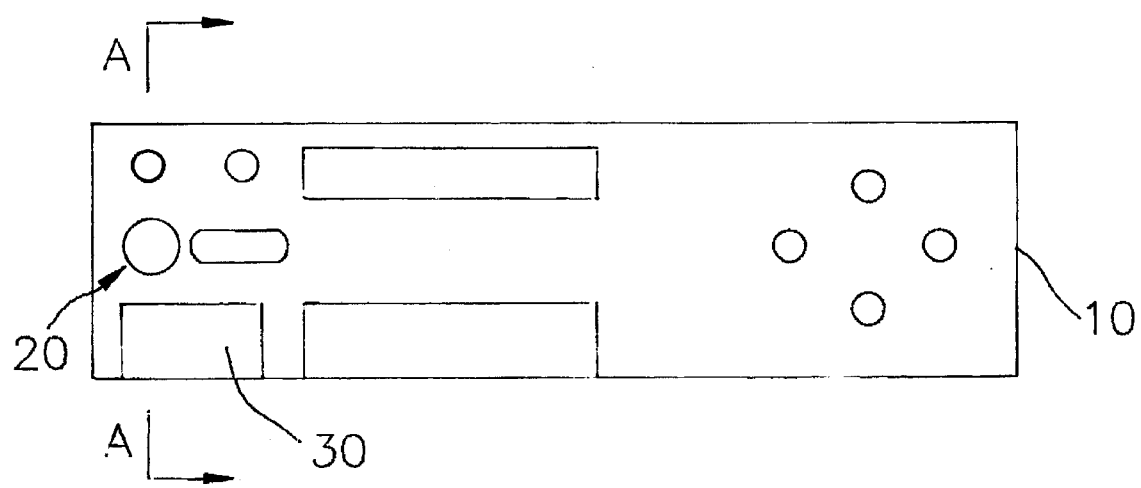
FIG. 1 shows a frontal view of a front panel of a video cassette recorder incorporating therein a device for exposing/concealing operating buttons for inputting recording reservation data in accordance with the present invention.

Referring to FIG. 1, there is shown a front panel 10 of a VCR, on which a door 30 and a preprogramming start button 20 appear. The preprogramming start button 20 serves to trigger to an opening action of the door 30. Further, the preprogramming start button 20 interrupts a system controller(not shown) which may be a CPU or a microprocessor supervising the various functions and operating modes of the VCR to thereby allow the system controller to change its running mode into a preprogramming mode for performing a reserve of recording, wherein the system controller receives recording reservation data. On a rear-side of the door 30, a plurality of operating keys used to input the recording reservation data, e.g., recording day, recording start time, recording end time, recording duration, recording speed and recording channel, etc., are hidden.

Figure 2:
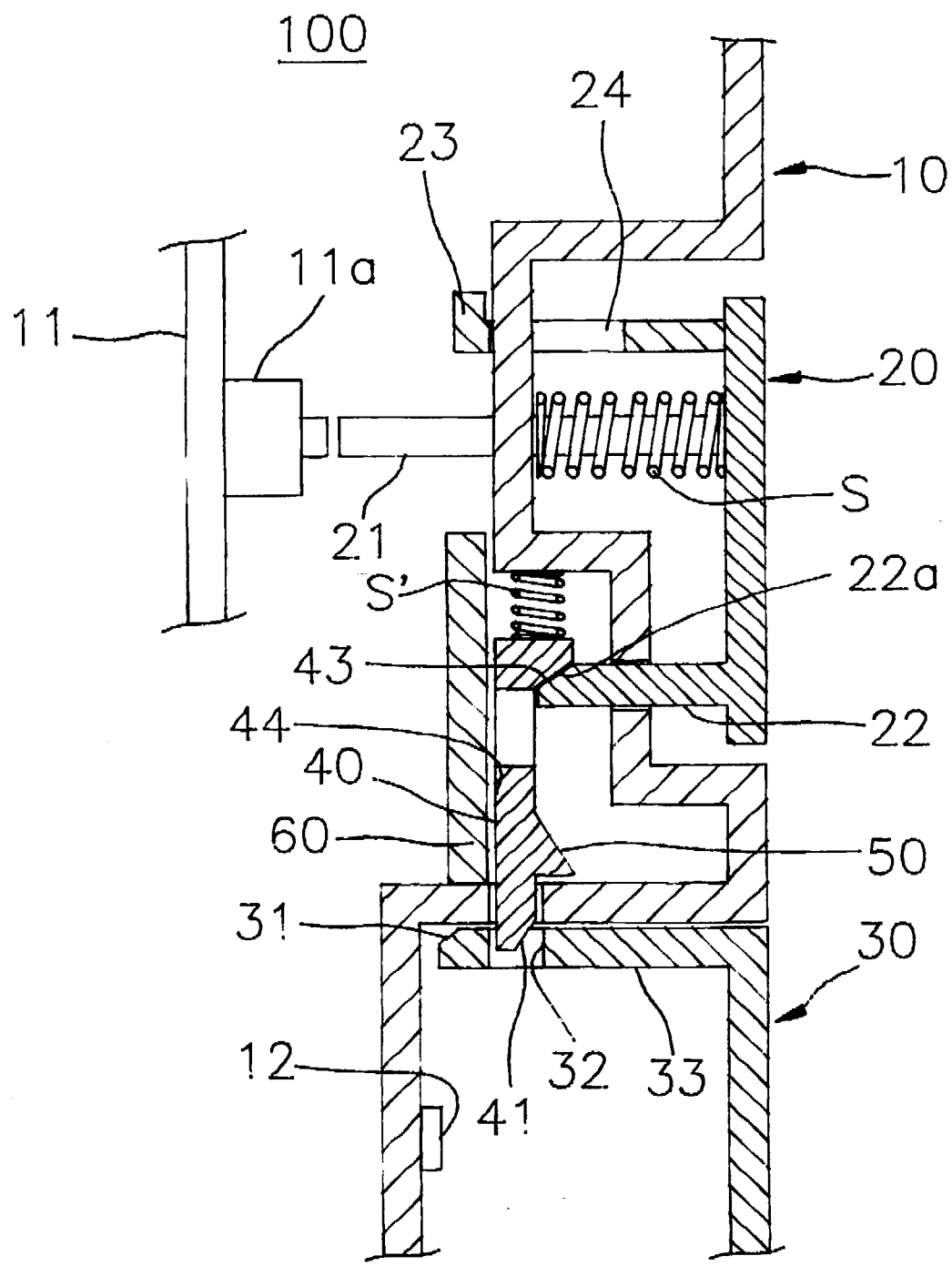
FIGS. 2 and 3 illustrate side sectional views of the door opening device taken along line A—A in FIG. 1, with a door therein being closed and opened, respectively.

In FIG. 2, there is shown a door opening device 100 of the VCR for selectively opening or closing the door 30 to expose or conceal the plurality of operating buttons 12 (only one is shown).

The preprogramming start button 20 is mounted on the front panel 10 in such a manner that its depressing bar 21 is aligned with a tact switch 11a. The tact switch 11a is used to transmit the user's instruction on the recording reservation data to the system controller. Namely, when the user pushes the preprogramming start button 20, the tact switch 11a is operated to allow the mode of the system controller to be changed into the preprogramming mode. The tact switch 11a is mounted on a printed circuit board 11 near the door opening device 100.

The preprogramming start button 20 is biased toward outside of the front panel 10 by a spring S retained around the depressing bar 21 between the front panel 10 and the main body of the preprogramming start button 20. The preprogramming start button 20 is provided with an urging member 22 having a slant surface 22a at its free end. The urging member 22 extends from an inner surface of the main body of the start button 20 to pass through the front panel 10.

On an upper part of the preprogramming start button 20, a stopper 23 is prepared for limiting an outward motion of the main body of the start button 20 caused by the resilient force of the spring S. The stopper is integrally formed with the post member 24 extending from the preprogramming start button 20. The preprogramming start button 20 and its parts 21, 22 and 23 constructed in this manner are horizontally slidable, as illustrated in FIG. 2.

Rotatably attached to a lower part of the front panel 10 through, for example, a hinge, is the door 30 provided with a folded extension 33 which has a pin receiver 32 and a distal slant surface 31. The door 30 is adapted to be opened by, for example, a torsion spring if no other forces are exerted thereon.

The plurality of operating buttons 12 are selectively exposed or concealed by the locking pin 40 which is mounted between the urging member 22 and the door 30. The locking pin 40 is slidably movable in a direction perpendicular to a motion of the preprogramming start button 20.

The locking pin 40 is retained through the front panel 10 at a lower end portion having a lower slant surface 41. The locking pin 40 also has an upper slant surface 43 contacted with the slant surface 22a of the urging member 22. A spring S' mounted between a front panel 10 and an upper end of the locking pin 40 urges the latter 40 downwardly.

A protruding stopper 50 is formed from the locking pin 40 in order to limit an insertion depth of the lower end portion of the locking pin 40 into the pin receiver 32. Positioned on a left-side of the locking pin 40 is a locking pin support 60 for providing the locking pin 40 with a sliding surface.

Operations of the inventive door opening device 100 described above will be explained with reference to FIGS. 2 and 3.

Assuming that the door 30 is closed as shown in FIG. 2, if the user pushes the preprogramming start button 20 so as to begin inputting the recording reservation data, the depressing bar 21 operates the tact switch 11a, allowing the current operating mode of the system controller to be changed into the preprogramming mode for recording. Further, the urging member 22 concurrently advancing with the depressing bar 21 biases the locking pin 40 upwardly in such a manner that the slant surface 22a of the urging member 22 is engaged on and depresses the upper slant surface 43 of the locking pin 40.

Figure 3:
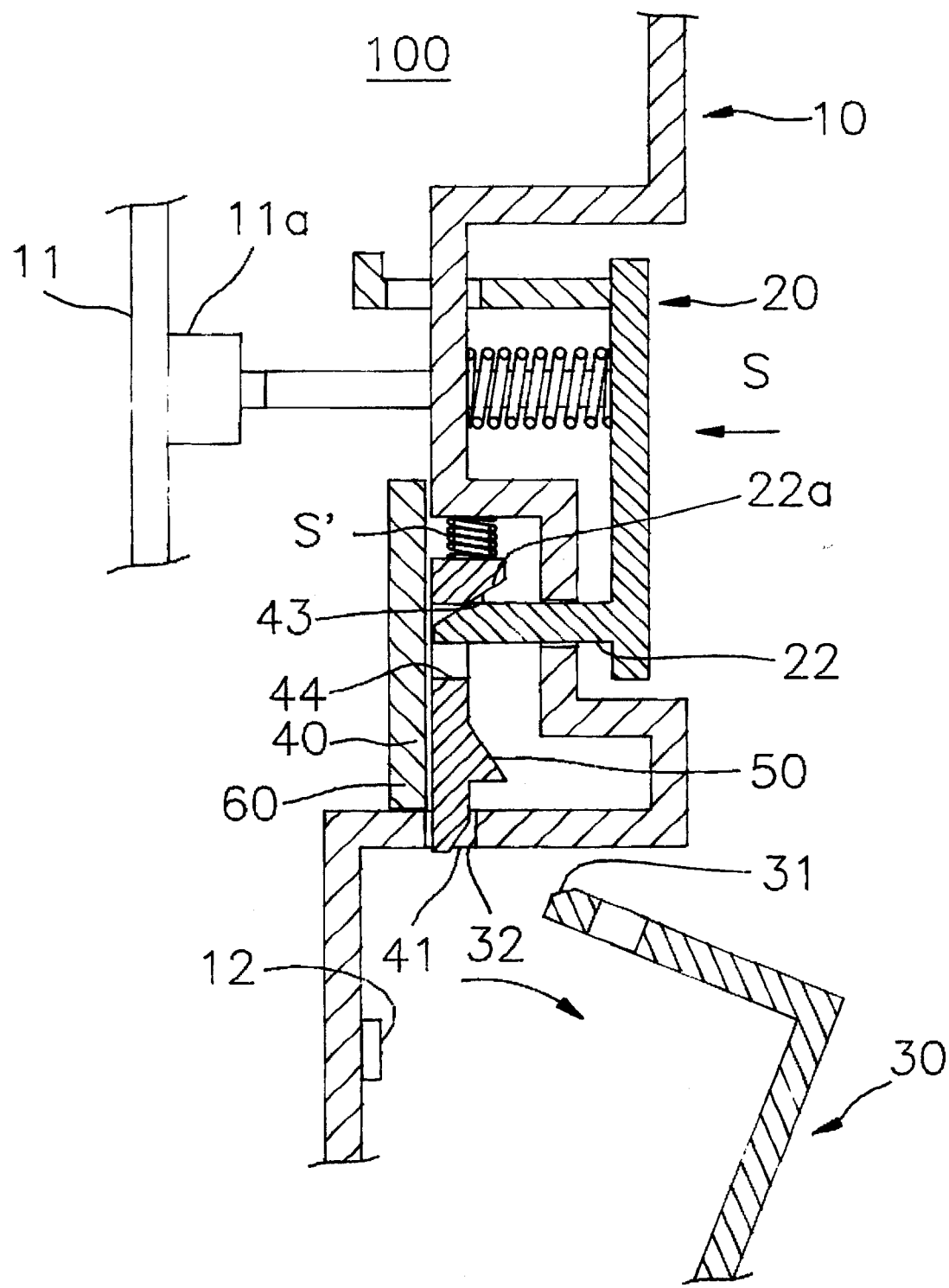

As shown in FIG. 3, in response to the biased movement of the locking pin 40, the lower end of the locking pin 40 is released from the pin receiver 32; and the door 30 is pivoted, thereby disclosing the operating buttons 12 on the front panel 10. In order to permit a further advancement of the slant surface 22a after its biasing action against the upper slant surface 43 of the locking pin 40, a receiving hole 44 is formed through the locking pin 40.

If the user removes his depressing force from the preprogramming start button 20, the latter 20 is retreated by the force of the spring S; and, in turn, the locking pin 40 is returned from the upward biased position by the force of the spring S'. After that, the user can approach the exposed operating buttons in order to input detailed recording reservation data.

After the button manipulating operations for inputting the recording reservation data have been completed, if the user pushes up the door 30 to close it 30, the slant surface 31 of the folded extension 33 pivotally depresses the lower slant surface 41 of the locking pin 40, slightly upwardly biasing the latter 40. After the slight upward movement, the locking pin 40 is descended by the spring S' to thereby prevent the door 30 from being unwantedly opened.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette recorder provided with a door opening device for selectively exposing or concealing operating buttons used to input recording reservation data and mounted on a front panel thereof, wherein the door opening device comprises:

a preprogramming start button slidably mounted on the front panel from a first position to a second position and including a button body positioned outside of the front panel, a depressing bar extending from the button body to pass through the front panel, and an urging member having an end-slanted surface and extending from the button body to pass through the front panel;

a door member pivotably attached to a lower portion of the front panel from a position wherein, when the preprogramming start button is in the first position, the door member is completely closed, to a position wherein, when the preprogramming start button is in the second position, the door is completely opened, and including a folded extension having a pin receiver and a slant surface at its free end; and an interlocking means slidable from a position wherein, when the preprogramming start button is in the first position, the interlocking means is retained through the pin receiver, to a position wherein, when the preprogramming start button is in the second position, the interlocking means is released from the pin receiver.

2. The video cassette recorder of claim 1, wherein the interlocking means includes a main body, a lower slant surface mounted at a lower portion of the main body and so shaped as to allow the main body to be upwardly biased due to an engagement of the slant surface of the folded extension thereon, a protruding stopper extending from the main body in order to limit an insertion depth of the main body into the pin receiver of the folded extension, an upper slant surface extending from the main body and so shaped as to allow the main body to be upwardly biased due to an engaged advancement of the end-slanted surface of the urging member therewith, a receiving through-hole formed through the main body in order to allow a further advancement of the end-slanted surface of the urging member, and a spring for downwardly biasing the main body.

3. The video cassette recorder of claim 2, wherein the preprogramming start button further includes a post member extending from the button body to pass through the front panel, a stopper integrally formed with the post member in order to prevent the button body from being further moved away from the front panel than the first position thereof, and a spring for biasing the button body from its second position toward the first position.

* * * * *